United States Patent [19]

Nonnenmacher et al.

[11] 4,118,931

[45] Oct. 10, 1978

[54] CONTROL ARRANGEMENT FOR A HYDROSTATIC DRIVE

[75] Inventors: Gerhard Nonnenmacher, Korntal; Walter Robeller, Böblingen; Karl Veil, Uhlingen, all of Fed. Rep. of Germany

[73] Assignee: Robert Bosch GmbH, Stuttgart, Fed. Rep. of Germany

[21] Appl. No.: 845,451

[22] Filed: Oct. 25, 1977

[30] Foreign Application Priority Data

Oct. 23, 1976 [DE] Fed. Rep. of Germany ....... 2648094

[51] Int. Cl.$^2$ ............................................ F16H 39/46
[52] U.S. Cl. ....................................... 60/444; 60/464; 60/465; 60/494
[58] Field of Search ................. 60/443, 444, 464, 465, 60/494

[56] References Cited

U.S. PATENT DOCUMENTS

| | | | |
|---|---|---|---|
| 3,167,907 | 2/1965 | Kempson | 60/444 X |
| 3,543,515 | 12/1970 | Kempson | 60/443 X |
| 3,808,811 | 5/1974 | Lepelletier | 60/465 X |

*Primary Examiner*—Edgar W. Geoghegan
*Attorney, Agent, or Firm*—Michael J. Striker

[57] ABSTRACT

A control arrangement for a hydrostatic drive comprises a gear pump driven by an internal combustion engine and supplying fluid to a fluid motor. The control arrangement is constructed in such a manner that even at a high number of revolutions per time unit of the internal combustion engine, the fluid motor may be operated at a low number of revolutions.

9 Claims, 4 Drawing Figures

CONTROL ARRANGEMENT FOR A HYDROSTATIC DRIVE

BACKGROUND OF THE INVENTION

The present invention relates to a control arrangement for a hydrostatic drive which has the purpose to influence the number of revolutions at the output end of the hydrostatic drive in such a manner that even at a high number of revolutions of an internal combustion engine driving a gear pump for supplying fluid to the fluid motor of the drive, this fluid motor may be operated at a low number of revolutions per time unit. This is for instance important at fork lifts which, during lifting of a load, have to be moved slowly.

It is known to provide for this purpose so-called inching devices which have a plurality of multiple way valves which, over a control circuit, influence the transmission ratio of the drive. This known arrangement requires however a considerable number of cooperating elements and especially considerable skill of the operator during slow movement of the lift fork and simultaneously lifting of the load.

SUMMARY OF THE INVENTION

It is an object of the present invention to provide a control arrangement of the aforementioned kind which is simpler in its construction than such control arrangements known in the art and which in addition simplifies the operation of apparatus in which the control arrangement is incorporated.

With these and other objects in view, which will become apparent as the description proceeds, the control arrangement according to the present invention for a hydrostatic drive mainly comprises a gear pump, a fluid motor, first conduit means connecting the gear pump with the fluid motor, a feed pump having an outlet, second conduit means connecting the outlet with the first conduit means, a throttle in the second conduit means, an internal combustion engine driving the gear pump and the feed pump, pressure proportional adjusting means in circuit with the second conduit means downstream of the throttle and operatively connected to the gear pump for adjusting the amount of fluid delivered per time unit by the latter depending on the pressure difference at opposite sides of the throttle, a pressure relief valve in circuit with the first conduit means for adjusting the gear pump upon reaching of a predetermined maximum pressure in the first conduit means in a direction reducing the amount of fluid delivered per time unit by the gear pump, and means operable at the will of an operator for adjusting the pressure of response of the pressure relief valve.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
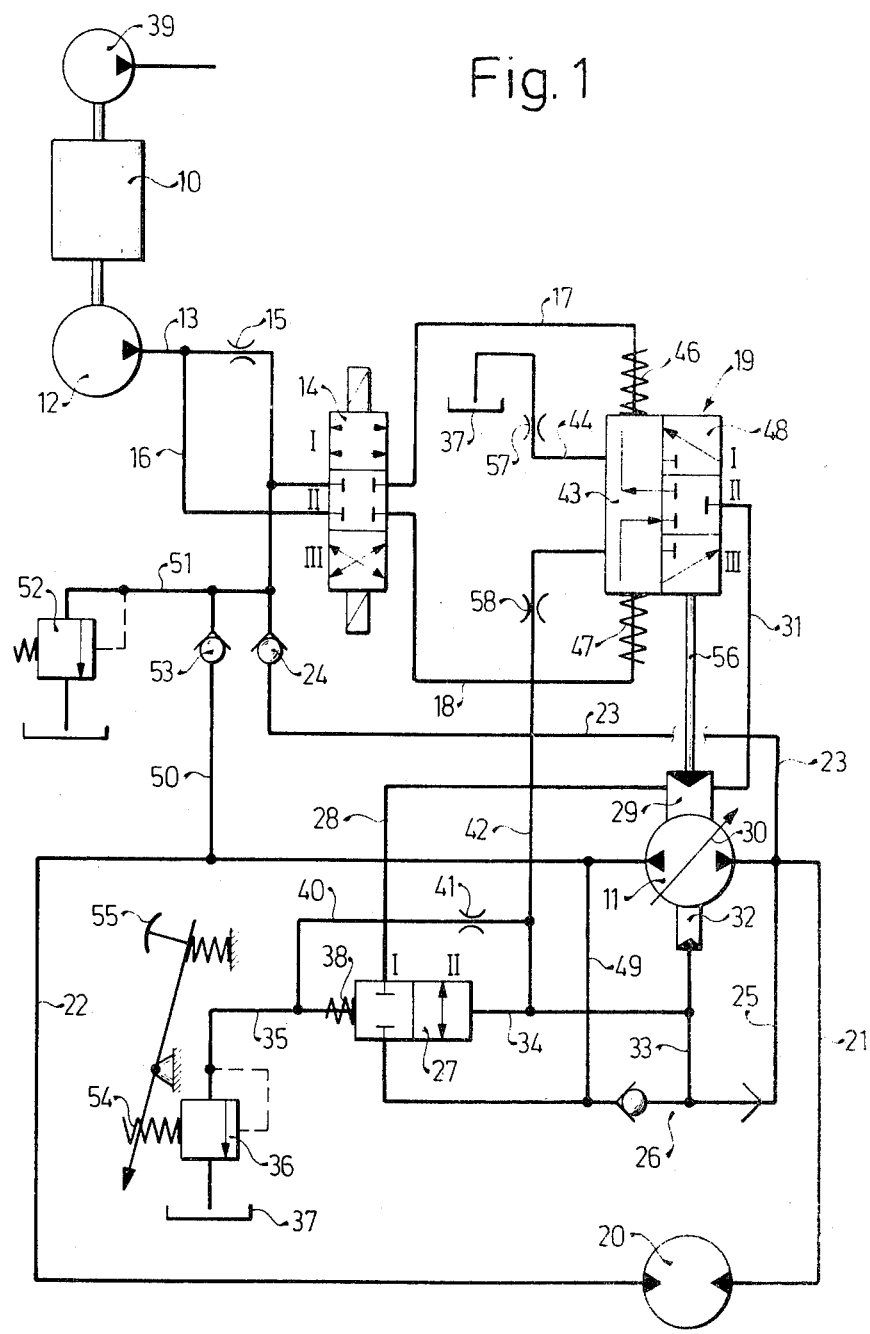
FIG. 1 schematically illustrates a control arrangement according to the present invention for a hydrostatic drive.

Referring now to FIG. 1 of the drawing, it will be seen that the control arrangement according to the present invention comprises an internal combustion engine 10 which drives in a manner well known in the art and not specifically illustrated in the drawing a gear pump 11, as well as a feed pump 12 and at least an additional hydraulic consumer 39. The feed pump 12 delivers a pressure fluid into a conduit 13. The conduit 13 leads to a multiple position valve 14 for the selection of the direction of movement of a vehicle driven by the hydrostatic drive of the present invention and not shown in the drawing. A measuring throttle 15 is arranged in the conduit 13 upstream of the valve 14. A conduit 16 branches off from the conduit 13 between the feed pump 12 and the throttle 15 and the conduit 16 leads likewise to the multiple position valve 14. The multiple position valve 14 is movable in a manner known per se between three positions, i.e., the positions I, II and III. Two conduits 17 and 18 lead from the multiple position valve 14 to opposite sides of a pressure proportional adjusting device 19. By means of the device 19, the gear pump is adjusted at an increasing pressure difference at the measuring throttle 15 to deliver a greater amount of fluid per time unit and at a decreasing pressure difference at the measuring throttle 15 to deliver a smaller amount of fluid per time unit.

The gear pump 11 delivers pressure fluid in a closed circuit to a fluid motor 20. For this purpose the gear pump 11 is connected by means of the conduits 21 and 22 with the fluid motor 20. A conduit 23 is connected to the conduit 21 and leads over a one-way valve 24 to the conduit 13. An additional conduit 25 branches off from the conduit 21 and leads over an alternating one-way valve 26 to a pressure relief valve 27, which is movable between two positions I and II. A conduit 28 leads from the pressure relief valve 27 to a control piston 29, which serves for the adjustment of the position of a control element 30 of the gear pump 11, which in turn determines the amount of fluid delivered by the gear pump. From the control piston 29, respectively from the cylinder in which the control piston is mounted, leads a conduit 31 to the adjusting device 19. A control piston 32 acts in opposition to the control piston 29 on the control element 30 of the gear pump 11, and the acting surface of the control piston 32 is smaller than that of the control piston 29. From the control piston 32, respectively from the cylinder housing the control piston 32, leads a conduit 33 to the alternating one-way valve 26. A conduit 34 leads from the conduit 32 to one end face of the relief valve 27 and from the opposite end face of the relief valve 27 leads a conduit 35 to a control valve 36, constructed as a pressure limiting valve, which can discharge the fluid to a tank 37. The valves 27 and 36 form a low-loss controllable pressure limitation for the gear pump 11. A spring 38 acts also on the side of the relief valve 27 to which the conduit 35 is connected. A conduit 40, in which a throttle 41 is arranged, leads from the conduit 35 to a conduit 42, which starts at the conduit 34 and ends on a control part 43 of the adjusting device 19. An additional conduit 44, in which a throttle 57 is arranged, leads from the control part 43 to the tank 37.

The conduits 17 and 18 end respectively on opposite sides of the control part 43 and springs 46 and 47 act respectively in addition on these opposite sides of the control part 43. The control part 43 cooperates with the multiple position valve 48 of the device 19, which multiple position valve 48 is movable between the three positions I, II and III.

A conduit 49 leads, closely adjacent to the gear pump 11, from the conduit 22 to the conduit 25. In addition, a conduit 50 leads from the conduit 22 to a conduit 51, which in turn leads from the conduit 23 to a pressure limiting valve 52 for the feed pressure of the drive. A one-way valve 53 is arranged in the conduit 50. The control or pressure limiting valve 36 is loaded by a spring 54, the pretension of which may be changed at the will of an operator by a pedal 55. An additional throttle 58 is arranged in the conduit 42.

Assuming that the gear pump 11 delivers pressure fluid into the conduit 21, then the latter becomes the high pressure conduit, whereas the conduit 22 constitutes a low pressure conduit into which the feed pump 12 feeds pressure fluid over the conduits 13, 51 and 50 and the one-way valve 53. A relatively low pressure will thus prevail in the conduit 22. The high pressure prevailing in the conduit 21 is transmitted over the conduit 25, the alternating one-way valve 26 and the conduit 33 to the control piston 32 and in addition it acts also over the conduits 34 and 40 onto the opposite end faces of the relief valve 27. The latter will be held if the control or pressure limiting valve 36 is closed, due to the action of the spring 38 in its blocking position I.

The pressure difference created at the measuring throttle 15 acts over the conduits 17 and 18 onto the control part 43 of the device 19, when the multiple position valve 14 is in the position I or III. In the following it is assumed that the valve 14 is in the position III. Since the feed pump 12 is driven by the internal combustion engine 10, the pressure difference at the measuring throttle 15 is increased by feeding additional gas to the internal combustion 10 and resulting increase of the number of revolutions of the latter, so that the control part 43 is moved in such a direction, as viewed in FIG. 1 downwardly, that the conduit 42, through which fluid of high pressure passes, will be connected with the conduit 31. The control piston 29 is now likewise impinged by high pressure fluid and, since the acting surface of the control piston 29 is greater than that of the control piston 32, the gear pump 11 will now be adjusted to deliver a greater volume of fluid per time unit.

On the other hand, if the number of revolutions per time unit of the internal combustion engine 10 is decreased by feeding a small amount of gas thereto, then the pressure difference at the measuring throttle 15 is likewise decreased, whereby the control part 43 of the device 19 is adjusted in such a manner that the control piston 29 is connected over the conduit 31 with the conduit 44. Pressure fluid may now flow out from the cylinder in which the control piston 29 is arranged so that the control piston 32, which is continuously acted upon by a high pressure fluid, adjusts the gear pump 11 to deliver a smaller volume of fluid per time unit. The multiple position valve 48 of the device 19 is mechanically coupled by means of a linkage 56 with the control piston 29. Such follower controls are well known in the art and, since not essential for the present invention, are therefore only shortly described and schematically illustrated in FIG. 1.

If the working pressure in the hydrostatic drive has reached an upper limit, then the pressure limit valve 36 opens so that the pressure fluid from the conduit 42 may flow over the conduits 40 and 35 to the tank 37. Due to the pressure difference forming at the throttle 41 in the conduit 40, the relief valve 27 is brought to its flow-through position II, whereafter pressure fluid from the cylinder, housing the control piston 29, may flow over the conduits 28, 25 and 49 to the low pressure circuit. This will result in an adjustment of the pump 11 to deliver a smaller volume of fluid until the pressure limiting valve 36 is again closed. This will assure a low loss pressure limitation. The throttles 57 and 58 assure that the pressure release will have priority with respect to the adjustment of the gear pump resulting from the throttle 15.

By the actuating of the pedal 55 by an operator, the pretension of the spring 54 of the pressure limiting valve 36 will be decreased and therewith its response pressure lowered. This is for instance carried out when the internal combustion engine 10 has to drive, besides the hydrostatic drive, also another hydraulic consumer, for instance a fluid motor 39. If the latter requires a high number of revolutions per time unit, while the vehicle driven by the fluid motor 20 has to move very slowly, the pedal 55 is actuated, whereby the gear pump 11, due to the above-described relief, is adjusted to deliver a very small volume of pressure fluid per time unit, which means that, despite a high number of revolutions of the internal combustion engine, the non-illustrated vehicle driven by the fluid motor 20 can still move very slowly.

Figure 2:
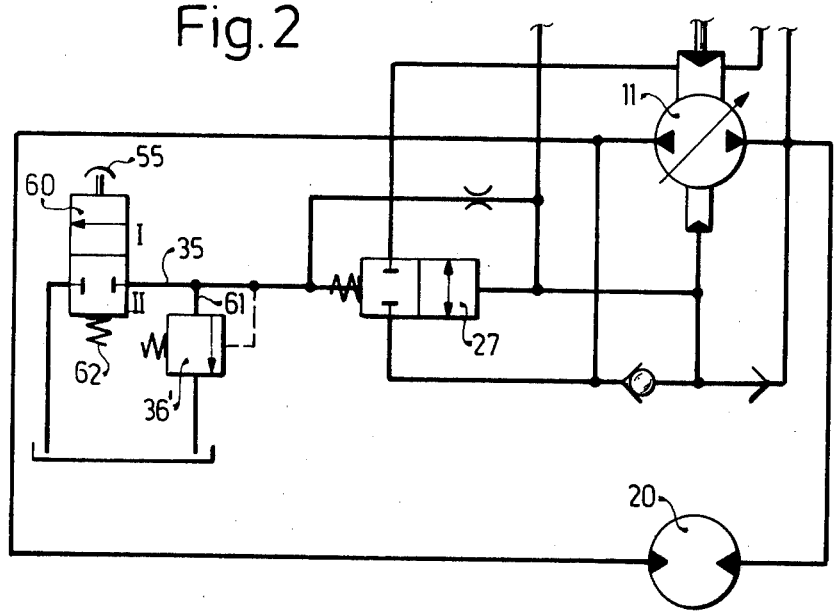
FIGS. 2 and 3 partly and schematically illustrate variations of the embodiment shown in FIG. 1.

The embodiment illustrated in part in FIG. 2 differs from the above-described embodiment, illustrated in FIG. 1, only in that a bypass valve 60 with two operating positions I and II is connected in parallel to the pressure relief or control valve 36'. The pressure relief valve 36' is connected to a branch conduit 61, which branches off from the conduit 35. The bypass valve 60 is operable by a pedal 55 in opposition to the force of a spring 62. The same action is produced on the relief valve 27 by the bypass valve 60 as by the influence of the valve 36 according to the embodiment shown in FIG. 1. If the bypass valve 60 is brought by the pedal 55 to its flow-through position I, the pressure of response of the relief valve 27 is likewise uniformly decreased. The bypass cross-section at the valve 60 steadily opens during operation of the pedal 55.

Figure 3:
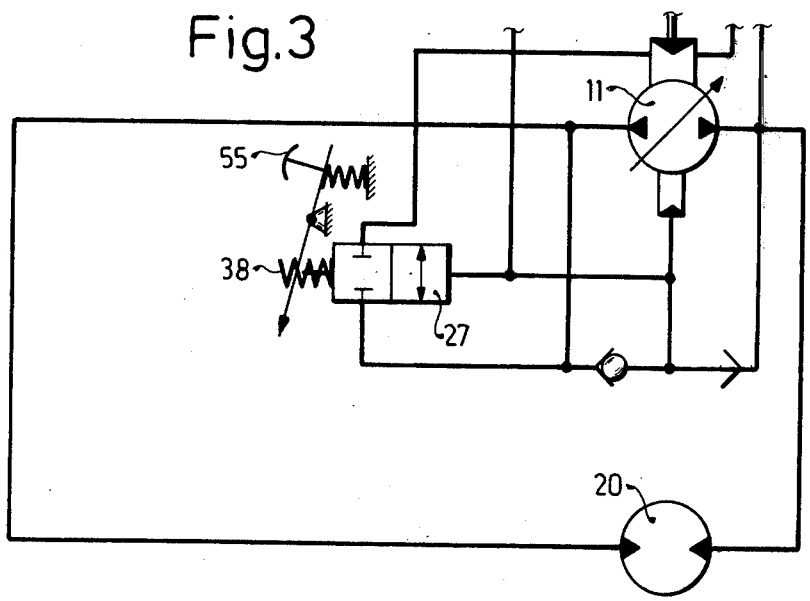

The low loss pressure limitation according to the embodiment shown in FIG. 3 shows that this embodiment does not need a control or pressure limiting valve 36. In the embodiment shown in FIG. 3, the pretension of the spring 38 acting on the relief valve 27 is varied by the pedal 55. In this embodiment the conduits 35 and 40 with the throttle 41 become therefore likewise unnecessary. However the function of the arrangement, partially shown in FIG. 3, is exactly the same as the embodiment illustrated in FIG. 1.

The suggested inching arrangement limits successively the turning moment transmitted by the transmission of the present invention. It corresponds in its action to an ideal friction coupling, without however producing the loss of the latter.

Figure 4:
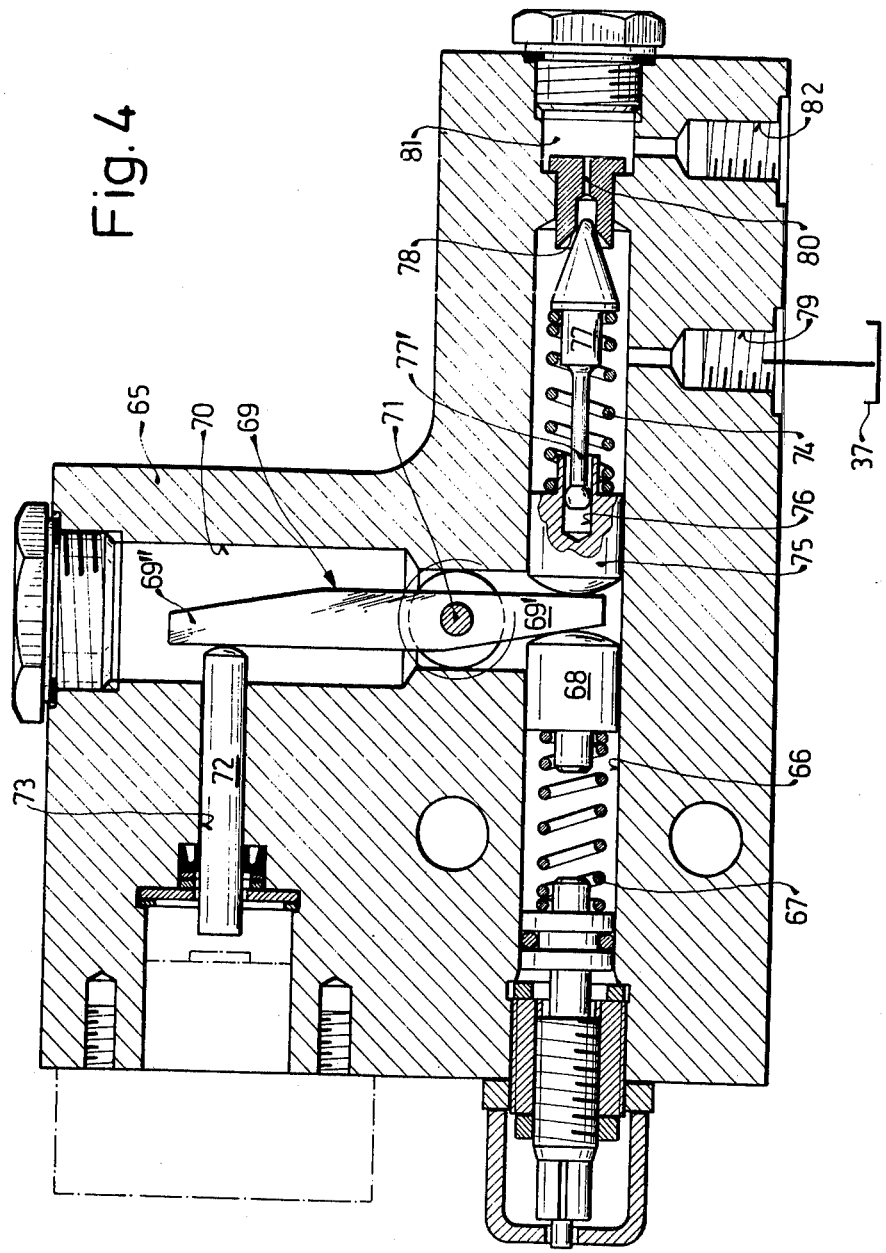
FIG. 4 is a cross-section through an element of the control arrangement shown in FIG. 1.

FIG. 4 illustrates a possible construction of the pressure limiting or control valve 36 of the inching arrangement according to the embodiment illustrated in FIG. 1. As shown in FIG. 4 the valve 36 comprises a housing 65 provided with a longitudinal bore 66 therethrough in which a piston 68, acted upon by a spring 67, is guided for movement in longitudinal direction. The piston 68 acts onto one arm 69' of a double armed lever 69. The lever 69 is located in a bore 70, which extends normal to the bore 66, and the lever 69 is tiltable about a pivot pin 71. A small piston 72, which is tightly guided in a bore 73, extending parallel to the bore 66, and which is movable by the takeup cylinder of a hydraulic remote control arrangement of known construction, acts on the other arm 69" of the lever 69.

A small piston 75 abuts under the force of a spring 74 against the other side of the lever arm 69'. The piston 75 is provided with a central blind bore 76 in which the end portion of a shaft 77' of a valve body 77 is mounted. The valve body 77 is pressed by means of a spring 74 against a valve seat 78, located at one end of the bore 66. A cross-bore 79 communicates in the region of the valve body 77 with the bore 66 to thus connect the latter with the tank 37 shown in FIG. 1. The valve seat 78 is formed with a bore 80 therethrough, which terminate in an end chamber 81 of the bore 66. The end chamber 81 is connected by a bore 82 with the conduit 35 shown in FIG. 1. The valve body 77 corresponds therefore to the control or pressure limiting valve 36 as shown in FIG. 1, so that its function has not to be described further.

It will be understood that each of the elements described above, or two or more together, may also find a useful application in other types of control arrangements for hydrostatic drives differing from the types described above.

While the invention has been illustrated and described as embodied in a control arrangement for a hydrostatic drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control arrangement for a hydrostatic drive comprising a gear pump; a fluid motor; first conduit means connecting said gear pump with said fluid motor; a feed pump having an outlet; second conduit means connecting said outlet with said first conduit means; a throttle in said second conduit means; a combustion engine driving said gear pump and said feed pump; pressure proportional adjusting means in circuit with said second conduit means downstream of said throttle and operatively connected to said gear pump for adjusting the amount of fluid delivered per time unit by the latter in dependence on the pressure difference at opposite sides of said throttle; a pressure-relief valve in circuit with said first conduit means and adjusting the gear pump upon reaching a predetermined maximum pressure in said first conduit means in a direction reducing the amount of fluid delivered per time unit by said gear pump; and means operable at the will of an operator for adjusting the pressure of response of said pressure relief valve.

2. A control arrangement as defined in claim 1, wherein said means for adjusting said pressure of response of the pressure relief valve comprises a valve operable at the will of an operator and arranged in circuit with said pressure relief valve.

3. A control arrangement as defined in claim 2, wherein said valve for adjusting the pressure of response of said pressure relief valve is movable between an open and a closed position and comprises a spring having a pretension normally holding said valve in said closed position, and operator controlled means for reducing said pretension of said spring so as to move said valve to said open position.

4. A control arrangement as defined in claim 3, wherein said operator controlled means comprises a pedal.

5. A control arrangement as defined in claim 2, wherein said means for adjusting the pressure of response of said pressure relief valve comprises a valve in circuit with said pressure relief valve and movable from a fully closed to a fully open position and including spring means biasing said valve to said fully closed position, and operator controlled means for moving said valve against the pressure of said spring from said fully closed towards said fully open position.

6. A control arrangement as defined in claim 2, wherein said valve in circuit with said pressure relief valve comprises a valve seat, a valve body movable toward and away from said valve seat, a tiltable two-arm lever, one arm of which being operatively connected to said valve body, spring means acting on said one arm of said lever for tilting the same in a direction moving said valve body into engagement with said valve seat, and operator controlled means engaging the other arm of said lever for tilting the same in the opposite direction.

7. A control arrangement as defined in claim 6, wherein said valve in circuit with said pressure relief valve further comprises a valve housing formed with a longitudinal bore therethrough which is closed at opposite ends, a pair of spaced pistons having facing ends and being axially movable in said bore, said one arm of said lever having an end portion located between and being engaged at opposite sides thereof by said pistons, one of said pistons being engaged by said spring means and the other of said pistons being connected to said valve body, said valve housing being provided with a second bore normal to said first bore in which said lever is tiltably arranged, and said valve housing being provided with a third bore parallel to said first bore and including a pressure pin axially movable in said third bore and engaging the other arm of said lever for tilting the latter against the force of said spring means, said pressure pin forming part of an operator controlled means.

8. A control arrangement as defined in claim 1, wherein said pressure relief valve is movable between a closed and an open position and including spring means of predetermined pretension biasing said pressure relief valve to said closed position, and wherein said means for adjusting the pressure of response of said pressure relief valve comprises means operable at the will of an operator for reducing the pretension of said spring means.

9. A control arrangement as defined in claim 8, wherein said means operable at the will of an operator comprises a pedal connected to said spring means.

* * * * *